March 5, 1968 R. R. LAW 3,372,228

TELEVISION SIGNAL RECORDER

Filed May 21, 1965 3 Sheets-Sheet 1

INVENTOR
RUSSELL R. LAW,
BY
Robert Thompson
ATTORNEY

INVENTOR.
RUSSELL R. LAW,
BY
Robert Thompson
ATTORNEY.

INVENTOR.
RUSSELL R. LAW,
BY
Robert Thompson
ATTORNEY.

United States Patent Office 3,372,228

Patented Mar. 5, 1968

3,372,228

TELEVISION SIGNAL RECORDER

Russell R. Law, Malibu, Calif., assignor to Hughes Aircraft Company, Culver City, Calif., a corporation of Delaware Filed May 21, 1965, Ser. No. 457,642
16 Claims. (Cl. 178—5.4)

ABSTRACT OF THE DISCLOSURE

A system for reducing the bandwidth requirements of a television signal including a sampler which samples one out of every $n$ information areas in a pattern that is repeated every X-frames, a multiple channel recorder for recording the sampled luminance and chrominance information on separate channels; and a circuit for reconstructing the television signal from the played-back sampled information including a plurality of storage tubes alternately operable so that X-frames of played-back luminance information is written into one storage tube while X-frames of previously stored luminance information is read out of another storage tube and a pair of tapped delay lines which delay the played-back sampled chrominance signals for time durations which are multiples of one horizontal scan line whereupon the delayed chrominance signals are combined on the same scan line with non-delayed played-back chrominance information.

This invention relates generally to a bandwidth reduction technique for television signals and relates more particularly to a means and technique for recording standard black-and-white, color television signals, and video signals on a conventional magnetic recording medium.

A transmitted color television video signal can be thought of as including two signal components; luminance; and chrominance. Under the NTSC broadcast standards adopted for color television transmission, the video portion of a television signal includes an amplitude-modulated luminance signal and a phase-amplitude, modulated subcarrier chrominance signal. In actual practice, the luminance signal has a flat envelope up to about 3.2 mc. of the bandwidth, while the chrominance signal operates on a subcarrier of about 3.58 mc. and has a relatively narrow bandwidth.

Because of the wide bandwidth of transmitted television signals, and the storage density limitations of magnetic tape, it has heretofore been difficult to record the broadcast signal on simple magnetic recorders, such as those home recorders that use one-fourth inch wide, half-mil base Mylar magnetic tapes run at longitudinal speeds up to 30-inches-per-second.

Accordingly, it is an object of this invention to provide recording means and method that overcomes the above-stated difficulties.

Another object of this invention is to provide a means and technique for compressing the bandwidth of black-and-white, and color broadcast video signals.

A related object is to provide a means and technique for recording a standard broadcast television signal on a simple tape recorder.

Another object is to provide a recording means and technique of the above type which is tolerant of time base instability resulting from factors such as tape skew, wow, flutter, or stiction.

Yet another object is to provide a device of the above type which is simple, reliable, and relatively inexpensive to make and operate.

The above and other objectives of this invention are attained on the basis of studies showing that much of the frame-to-frame video information of a television signal is redundant. On this basis, bandwidth reduction of a standard 525 line by 525 line, 30-frame-per-second television picture has been achieved by halving both the horizontal resolution and the vertical resolution, and reducing the frame repetition rate by a factor of 3.

To achieve the bandwidth reduction there is provided a sampling circuit that utilizes only certain portions of the luminance and the chrominance television picture signals. In other words, considering the television picture to be a planar grid of mosaic elements, a repeated sampling of only one out of every $n$ mosaic element makes it possible to record the television picture signal on a simple magnetic tape recorder and to stay well within the storage density limitation. By repeating the sampling pattern so that scanning of the same mosaic elements will be repeated only once every X-frames, an acceptable picture or image signal is recorded which, when played back, will have a uniform appearance.

In playing back the recorded luminance signal, the signals stored on the magnetic tape are sampled so that X-successive frames are sequentially written into and combined in one of a plurality of storage means. In operation, while one of the storage means is being written into, another storage means is being read out, and still another storage means is being erased. As a result, a reduced resolution picture or image can be reconstructed which should have a uniform appearance and a high flicker rate.

In the specific embodiment to be described, a halved image resolution and a reduced frame repetition rate of 10-frames-per-second is reasonably acceptable to a viewer. One basis for this conclusion is the early studies by E. W. Enstrom, "Television Image Characteristics" Proc. I.R.E., Vol. 21, pp. 1639–1651, Dec. 1933, which concluded that 240 horizontal lines would be adequate to provide a satisfactory picture. Confidence in this conclusion is bolstered by the fact that a typical home television set can be so badly out of adjustment that the horizontal resolution is about halved and the average viewer will not object. In addition, the interlace of home television sets is frequently sufficiently out of adjustment so that the vertical resolution is also halved. With regard to the reduced frame rate, experience with a home motion picture run at 16-frames-per-second indicates that the 30-frame-per-second rate of a television is unnecessarily high. In addition, when the frame rate of home movie is reduced, the real objection is in the brightness flicker. Since the specific embodiment to be described is played back at a 10-frame-per-second frame rate with a 30-cycle-per-second flicker rate, the reduced frame rate is not objectionable.

Color television chrominance signals can also be recorded on separate tracks on the same magnetic tape. This recording is achieved by sampling the chrominance signal, which is composed of an I-vector component and a Q-vector component in quadrature with one another, and recording these sampled vector components on separate magnetic tracks as amplitude signals. This recording of the I-vector and the Q-vector is also accomplished by a sampling technique in which only one out of every $n$-color elements is recorded on the tape. Thus, the chrominance signal component is reduced in bandwidth to within the storage density limitations of the magnetic medium.

In playing back the chrominance signal, the signals stored on the magnetic tape are sampled and delayed in such a manner that the played-back chrominance signals will be reconstructed in a manner that gives an illusion of high resolution color. For example, in the specific embodiment to be described, an illusion of color resolution of 120 lines horizontally by 105 lines vertically is achieved as compared to the NTSC color resolution of 262.5 lines by 262.5 lines.

Time base stability difficulties are overcome by laying down a pilot frequency on the middle track 3 of a fivetrack recording. To reduce any time base error in the luminance signal and in the I-vector component of the chrominance signal, these signals should be recorded on the next two adjacent tracks 2 and 4. The Q-vector component of the chrominance signal and the sound signals should be recorded on the two outermost channels 1 and 5.

Other objects, features, and advantages of the invention will become apparent upon reading the following detailed description of one embodiment and referring to the accompanying drawings in which.

Figures 1, 3:
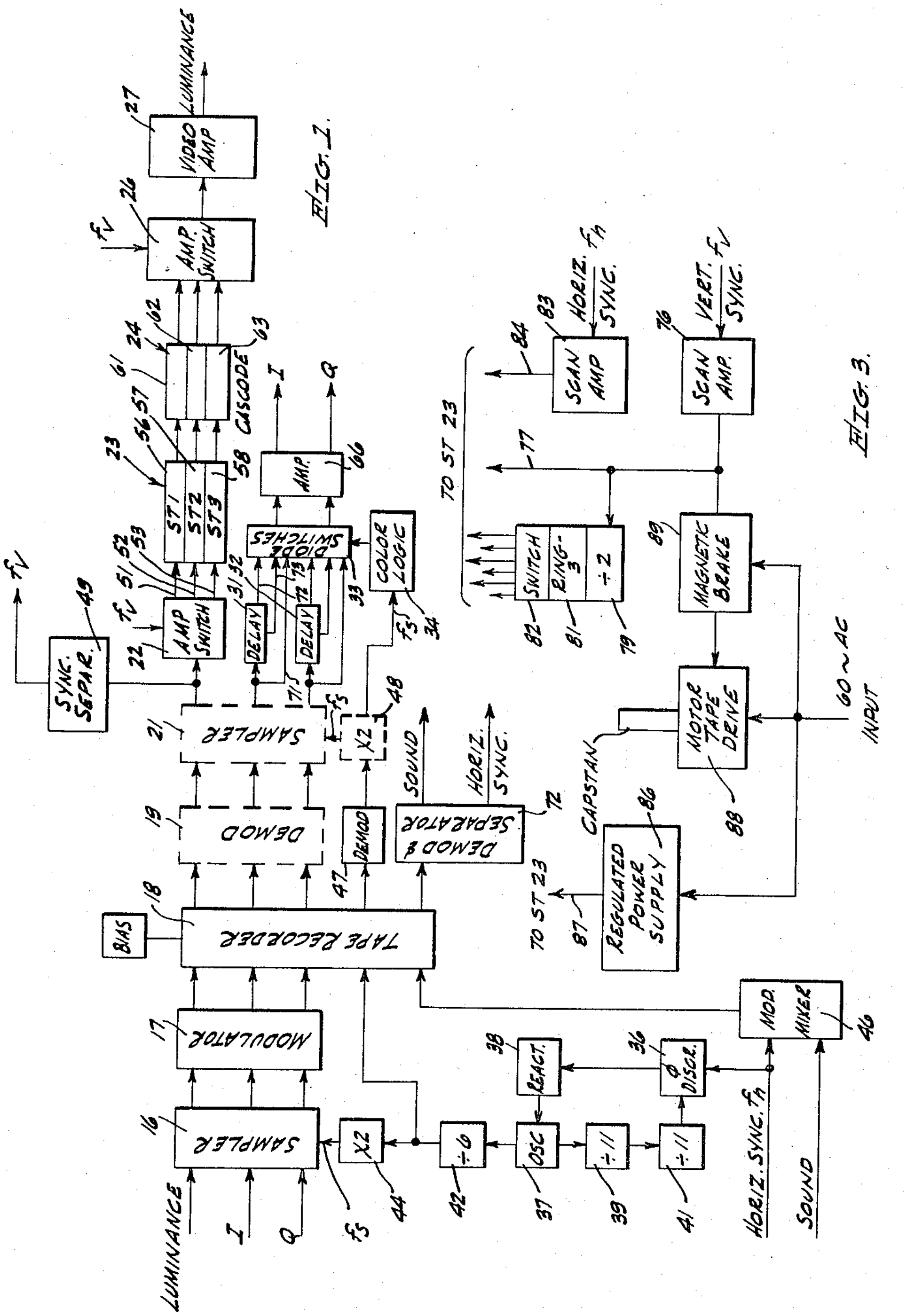
FIG. 1 is a schematic block diagram of a preferred circuit for reducing the bandwidth of a television signal, recording the reduced bandwidth signal, and playing back the recorded television signal
FIG. 3 is a circuit for controlling the tape speed and the storage device of the circuit of FIG. 1.

Referring now to the drawings, the circuit of FIG. 1 can be operated in combination with a standard black-and-white or color home television receiver (not shown).

For a black-and-white, and color television signal, the detected video information is in the form of: a luminance signal component having a single waveform and; a chrominance signal component having an I-vector waveform in quadrature with a Q-vector waveform.

In operation, detected video signals are applied to a sampler circuit 16 which periodically extracts signal information from the video input waveforms when periodically activated by a sampling pulse $f_s$. This sampling period can be controlled by a video synchronism signal such as the horizontal synchronism pulse $f_h$. The sampled video information is fed to a modulator 17 which produces signals which can be recorded on separate channels of a recording medium within a recorder 18. In addition, a sound signal and the horizontal synchronism signal $f_h$, and a pilot signal or reference signal $f_p$ can be recorded on separate channels of the recording medium within the recorder 18.

At some later time, the recorded signal can be played back and reconstructed as a component video signal that is applied to a television receiver for viewing. In operation, the video signal played back from tape recorder 18 is detected by a demodulator 19 which produces a usable signal form. The output from the demodulator is applied to a sampler circuit 21 which is periodically activated by the recorded pilot signal $f_p$, fed through a demodulator 47 and a frequency doubler 48 enabling the video signals to be reconstructed in the following manner.

The luminance component signal is applied through a switch 22 to a storage device 23. The storage device 23 operates so that as one play-back frame is being written in, the preceding play-back is being read out and the play-back frame preceding the read out frame is being erased. The read out frame is applied to a cascode amplifier 24. The amplified read out signals are applied to a switch 26 which selectively connects the read out signal to a video amplifier 27.

The chrominance signals are also detected from the storage medium by the demodulator 19 and fed to the sampler 21. The sampler 21 is selectively activated by the recorded pilot signal $f_p$ so that the vector components I and Q are applied to delay means 31 and 32 so that the information stored at three separate portions of the recording channels will be simultaneously received by and combined at a diode switch 33. The diode switch 33 is operated by a color logic circuit 34 which is also controlled by the pilot signal $f_p$ so that the I-vector and the Q-vector can be applied to the television receiver.

As previously stated, a television picture can be thought of as a sequence of mosaic elements laid down on 525 horizontal lines at a repetition rate of 30 frames-per-second. Actually, each frame can be further divided into two interlaced fields in which one field is first laid down along all of the odd-numbered horizontal scan lines and the other field is subsequently laid down along all of the even-numbered horizontal scan lines.

Figure 2:
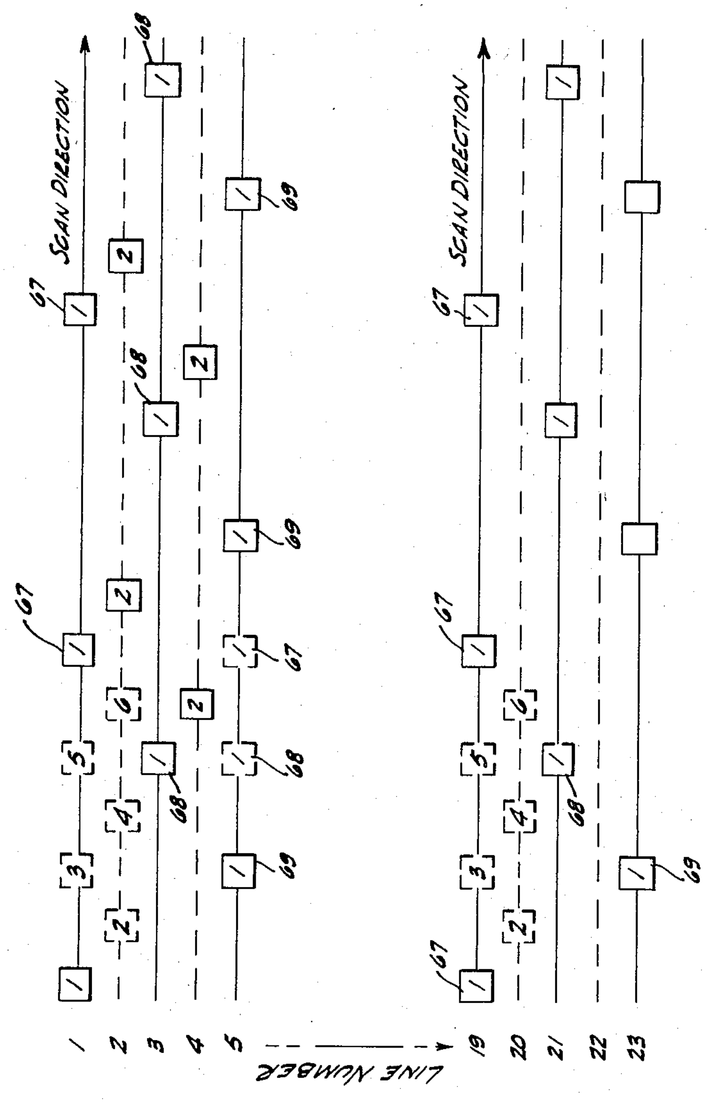
FIG. 2 is a graph illustrating a sampling technique that can be used by the circuit of FIG. 1 on a television picture mosaic.

Referring back to the drawing, FIG. 2 graphically illustrates a sampling sequence used in the circuit of FIG. 1 to reduce the bandwidth requirements of the television signal. In accordance with the principles of this invention, the sampling sequence of the mosaic is such that only one mosaic element out of every $n$ is extracted from the video signal. Such a sampling sequence is illustrated in FIG. 2 with the elements containing a 1 being the sampled elements of the first field, the elements containing a 2 being the sampled elements of the second field, the elements numbered 3 being the sampled elements of the third field, and so forth. One particular sampling sequence that is especially useful is to sample one picture element out of every six. One way that this sampling sequence can be achieved is to multiply the horizontal synchronism signal $f_h$ by the relation $$\frac{(11)(11)}{(3)}$$

In other words, since the horizontal synchronism signal equals 15.75 kc., the sampling frequency $f_s$ equals 635.25 kc.:

$$f_s=15.75\times\frac{(11)(11)}{(3)}=635.25 \text{ kc.}$$

By using this particular sampling frequency $f_s$, the sampling sequence illustrated in FIG. 2 can be achieved in which every sixth mosaic element is sampled. Closer analysis of the graph of FIG. 2 reveals that after three real time frames (six fields), the pattern of sampled elements is uniformly distributed across the mosaic. Of course, every other mosaic element of the full mosaic is never scanned.

The above described sampling technique is achieved in the following manner.

As previously described, the detected video signal is applied to the sampler 16 which is periodically activated by a sampling pulse signal. The sampler 16 can be of the type described in Zworykin and Morton's "Television," Wylie & Sons, 2d ed., 1954, p. 599. To achieve a sampling signal frequency of 635.25 kc., the horizontal synchronism signal $f_h$ is applied to a phase discriminator 36 for phase comparison with a reduced frequency feedback signal from an oscillator 37. The output of the phase discriminator 36 has an amplitude related to the phase difference between these two signals and controls the magnitude of the reactance of a reactance tube 38. By setting the oscillator 37 to nominally operate at a frequency of $(11)(11)\times15.75$ kc., the feedback signal to pulse divider circuits 39 and 41 will be reduced in frequency to the same frequency as the horizontal synchronism signal $f_h$. Thus, once the feedback signal is at the same frequency and phase as the horizontal synchronism signal $f_h$, the oscillator 37 is stabilized. A circuit for the phase discriminator 36, the oscillator 37, and the reactance tube 38 is described and illustrated in the above referenced "Television" on page 596. Suitable pulse divider circuits are described and illustrated in the book Heathkit Color Bar and Dot Generator Model CD–1.

Rather than directly $\div3$ the output of the oscillator 37, the output signal is $\div6$ by a pulse divider circuit 42 of the above-referenced type. The resultant output of the pulse divider 42 is used as a pilot frequency $f_p$ and is applied to the center recording channel of the tape recorder 18 over the line 43. As a result, the pilot frequency $f_p$ is within the storage density limitations of a magnetic tape running at 30-inches-per-second. To obtain the above-referenced sampling frequency of 635.25 kc., a portion of the output of the pulse divider 42 is multiplied by 2 at a frequency doubler circuit 44. A suitable multiplier circuit 44 is described and illustrated in The Radio Amateur's Handbook, 32nd ed., 1955, p. 147.

Thus, when the sampling signal $f_s$ is applied, the sampler circuit 16 extracts information from the detected video signals in the previously described sampling sequence (FIG. 2). The sampled luminance and chrominance signals from the sampler 16 are fed to a modulator 17 which converts the signals to a form suitable for recording on the tape recorder 18. A modulator that could be used is described and illustrated in Assembling and Using Your Heathkit Tape Recorder Electronics Model TE–1, copyrighted 1958 by Heath Co., Benton Harbor, Mich.

Referring now to the tape recorder 18, a suitable tape recorder is the above-referenced Heathkit Model TE–1. As previously mentioned, the pilot frequency $f_p$ is applied to the center track numbered 3, whereas, the luminance signal and the chrominance signal I-vector component should be recorded on the next adjacent outer tracks numbered 2 and 4. The chrominance signal Q-vector component can be recorded on one of the outside tracks, such as number 5.

Rather than use separate recorder channels for the synchronism signal $f_h$ and for the sound signal, these two signals can be applied to a modulator mixer 46 that mixes the two signals. One type of modulator mixer is described and illustrated in the above-referenced Heathkit Model TE–1. Since the horizontal synchronism signal $f_h$ is at 15.75 kc., it does not unduly affect the sound signal. Thus, the mixed signal can be recorded on one of the outermost recording tracks, such as number 1. It should also be understood that the vertical synchronism signal $f_v$ can be readily derived from the luminance signal.

With this particular arrangement for recording the signals, it is possible to achieve a high degree of tolerance of possible signal time instability. For example, with this recording arrangement, it has been determined that the time base errors of the luminance signal and the chrominance I-vector signal would be less than ±200 nanoseconds. The chrominance Q-vector signal, which is further laterally displaced from the pilot signal $f_p$, might exhibit time base errors in the range of ±300 nanoseconds.

An advantage of this recording technique is that 60 minutes of television programming can be recorded on a standard 11-inch reel of quarter-inch wide, half-mil Mylar base recording tape.

Once the program is recorded the tape can be rewound and the tape stored for later viewing.

When the program material is to be viewed, the tape is rerun through the tape recorder 18 wherein the luminance signal and the chrominance signal are fed into the demodulator 19. Demodulator 19 converts the output signal from the tape into a usuable electrical waveform for the image signal reconstructing electronic circuit stages.

In addition, the pilot frequency $f_p$ from the center recording channel is applied to a demodulator 47 and converted to a form usable in the image signal reconstructing electronic circuitry. Both the demodulator 19 and the demodulator 47 are of the type described and illustrated in the previously-referenced "Heathkit Tape Recorder Model TE–1." The demodulated pilot signal $f_p$ is applied to a multiplier circuit 48 which doubles the pilot signal frequency to the sampling frequency of 635.25 kc. The output from the frequency doubler of multiplier 48 periodically activates the sampler 21 so that the sampler 21 periodically extracts the signal information from the demodulated playback signals and feeds the extracted information to the following electronic image reconstructing stages.

In operation, the luminance signal is reconstructed in one circuit, whereas, the chrominance signal is reconstructed in a separate circuit. In the following detailed description, the circuit used to reconstruct the luminance signal is to be described first and then the circuit used to reconstruct the chrominance signal will be described.

The played-back luminance signal is applied to an amplifier switch 22 and to a signal separator 49. The signal separator 49 separates the vertical synchronism signal $f_v$ from the luminance signal wherein the vertical synchronism signal can be used as a control signal in a manner to be dsecribed later. One signal separator that will perform this function is described and illustrated in the previously-referenced "Television" p. 591.

The portion of the played-back luminance signal fed to the amplifier switch 22 is amplified and selectively applied to the storage device 23 in a sequential frame-by-frame basis, as controlled by the vertical synchronizing signal $f_v$. In other words, the playback signal for three consecutive frames (six fields) is conducted over output lead 51, the playback signals for the next three frames are conducted over output lead 52, and the playback signals for the following three frames are conducted over output lead 53 wherein this sequence could be continually repeated. One amplifier switch that will perform this function is described and illustrated in Millman and Taub, "Pulse and Digital Circuits," McGraw-Hill, 1956, p. 436.

The storage device 23 includes a plurality of storage tubes 56–58. A suitable storage tube that could be used would operate on the electrical read-in and the electrical read-out principles described by A. S. Luftman in "Recording Storage Tubes and Their Application," Electronics World, May 1963. In operation, as one storage tube is being written into for storing three real time frames (one play-back frame), another storage tube is being repeatedly read for three real time frames, whereas, the third storage tube is being erased. Of course, where the erase time of the storage tube is quite short, it could be possible to use only two storage tubes, thereby eliminating a third storage tube. With the above write-in technique, the combined frame on a storage tube at the time of read is the composite of all mosaic elements 1 through 6. Thus, the composite frame has a one-half horizontal resolution, and a one-half vertical resolution and is repeated at a frame rate of 30-frames-per-second.

The read out signals from the storage device 23 are individually fed to one of three parallel cascode amplifiers 61–64. The output signal from the cascode amplifiers has a high gain and a low noise factor. A suitable cascode amplifier is described and illustrated by E. J. Angelo in Electronic Circuits, McGraw-Hill, 1958, p. 281.

The output from each cascode amplifier is applied to the amplifier switch 26 which amplifies and selectively feeds the signal to the video amplifier 27. The vertical synchronism signal $f_v$ is used to control the selective switching operation. A suitable amplifier switch that will perform this operation is described and illustrated in the previously-referenced "Pulse and Digital Circuits," p. 436.

The video amplifier 27 is a wideband amplifier capable of amplifying the video frequency. One suitable amplifier is described and illustrated in the previously-referenced "Television" p. 729. The output signal from the amplifier is a video luminance signal which is applied to a television receiver (not shown) where the play-back luminance signal can be displayed for a viewer.

With the specific sampling sequence given, the video signal will have both its vertical and its horizontal resolution halved and its frame rate reduced by one-third. This can be understood from the previously-described sampling sequence in which every sixth mosaic element is sampled for six fields (3 frames) before the sampling pattern will be repeated. As a result, the reconstructed picture has a uniform appearance, whereas, the reduced frame rate of 10-frames-per-second is not especially noticeable since the flicker rate is still a 60-cycle-per-second.

Referring now to the play-back chrominance signal, the demodulated chrominance signal is applied to the sampler 21, whereafter the I-vector component and the Q-vector component are reconstructed in the following sequence. Since the I-vector component and the Q-vector component have been recorded in the same sampling sequence as the luminance signal, the graph of FIG. 2 can also be used to explain the reconstruction operation for the chrominance signals.

Also, since the I-vector component and the Q-vector component are both reconstructed in an identical manner, only the reconstruction of the I-vector component will be described in detail.

In operation, the I-vector component signal detected from the number 4 recording track is demodulated by demodulator 19 and applied to the sampler 21. The sampler 21 is periodically activated by a sampling frequency signal from the multiplier 48 so that the chrominance information stored at a plurality of selected spots on a magnetic tape are selectively delayed so that they are received at the diode switch 33 that acts as a commutator switch to serially apply the chrominance signals to an amplifier 66.

In combining the chrominance signal components, the information corresponding to each separate mosaic element will be applied to the diode switch 33 three separate times in the following manner. For example, the chrominance information corresponding to a group of the elements number 1 of the first frame which are identified by the reference characters 67, 68 and 69 (FIG. 2) are all reconstructed on play-back scan line 5 in the sequence of 69, 68 and 67, which is just the opposite of the sequence in which they were recorded. For example, the played-back chrominance information for scan line 1 mosaic 67 is fed through the delay line 31 and a conductor 71 and is in effect applied to the diode switch three separate times. A suitable delay line 31 that can be used is described by J. H. Eveleth in "Recent Developments in Solid Delay Lines," Systems Design, December 1964, pp. 16–20, and would have a full time delay parameter of 126.8 microseconds which is equal to the time interval required for two full horizontal scan lines, and a center tap time delay of 63.4 microseconds which is equal to the time interval required for one full horizontal scan line. This particular time delay parameter is especially noteworthy with the sampling sequence illustrated in FIG. 2, since the chrominance information corresponding to scan line 3 mosaic element number 68 will be applied to the diode switch 33 after a time interval equal to 63.4 microseconds or one full scan line later than it was initially played back. And the chrominance information corresponding to the scan line 1 mosaic element number 67 will be applied to the diode switch 33 at 126.8 microseconds or two full scan lines after the initial playback. Thus, in reconstructing a portion of scan line 5, the playback pulse corresponding to mosaic element 69 is first applied to line 71 and the diode switch 33, then the previously played-back pulse corresponding to the mosaic element 68 reaches the center tap line 73 and is applied to diode switch 33. Then, shortly after the playback pulse corresponding to the mosaic element 68 is received by the diode switch 33, the chrominance information corresponding to mosaic element 67 reaches the end of delay line 31 and is applied to the diode switch 33. This reconstruction sequence is represented by the dashed line mosaic elements 68 and 67 on line 5 of FIG. 2. The diode switch 33 acts as a commutator switch and sequentially selects one bit or mosaic of the above-described delayed and nondelayed chrominance signals at any one instant. Since the I-vector and the Q-vector are in quadrature only the amplitude of the component is important. Thus, the information corresponding to the mosaic elements provides amplitude signals with an already predetermined phase relationship.

The Q-vector component is recombined and reconstructed in the above-described manner by the delay line 32, wherein three selected information pulses are also sequentially applied to the diode switch 33.

As previously described, the diode switch 33 acts as a commutator switch and is selectively activated by an output signal from the color logic circuit 34 to selectively pass the I-vector signal components and the Q-vector signal component to an amplifier 66. One suitable diode switch that could be used is described and illustrated in the previously-referenced "Pulse and Digital Circuit," p. 445.

The color logic circuit 34 is controlled by a sampling signal output from the frequency doubler 48 and provides a control signal for the diode switch 33. A suitable color logic circuit is illustrated and described in the previously-referenced "Pulse and Digital Circuit," p. 343.

The amplifier 66 amplifies the play-back signal to a usable level for the television receiver (not shown). A suitable amplifier is described and illustrated in the previously-referenced "Television," p. 729.

The above-described technique of following a non-delayed play-back pulse with two other delayed play-back pulses is thereafter continued until the chrominance information corresponding to each mosaic element has been played back three times. In other words, each mosaic element is played back: initially; after a one horizontal scan line delay; and after a two horizontal scan line delay.

With the above-described playback technique, the recorded chrominance or color resolution was degraded, having a color resolution of 40⅓ lines horizontally by 525 lines vertically. By using each recorded color element three times and combining them in the above manner, the color resolution appears to be 121 lines horizontally by 105 lines vertically. This degree of degradation is not excessive and may not be proportionally worse subjectively than the present NTSC system wherein the I-signal and the Q-signal bandwidths are 1.3 microseconds and 0.4 microsecond, respectively.

The combined sound signal and horizontal synchronism signal $f_h$ are played back from the outer recording record channel 1 and are demodulated and separated at the demodulator and separator 72. The separated sound signal is then applied to the television receiver (not shown) where it becomes part of the played-back television programming. The horizontal synchronism signal is used to control the operation of the signal reconstruction circuit in a manner to be described.

The circuit illustrated in FIG. 3 controls the above-described storage tube operation in the following manner. The vertical synchronism signal $f_v$ from the signal separator 49 (FIG. 1) is applied to a scanning amplifier 76 to produce a vertical scan signal on the lead 77. One amplifier that could be used to produce the vertical scan signal is described in the previously-referenced "Television" on page 575. This vertical scan signal is simultaneously applied to all of the storage tubes 56, 57, and 58 and continually controls the vertical scan deflection plates therein.

In addition, the output from the scan amplifier 76 is fed to a vertical logic circuit 78 that controls which of the storage tubes is to be written into and read out of. One way that this logic operation could be achieved is to feed the output of the amplifier 76 to a first stage signal divider 79 of the type described in the previously-referenced "Heathkit Color Bar and Dot Generator Model CD–1," for dividing the signal by two. The output from divider 79 is applied to a ring counter stage 81, of the type described in the previously referenced "Pulse and Digital Circuits" on p. 343, which counts the divided signal by three. The output from the ring counter 81 is applied to a multiple output switch 82 of the type described in the previously referenced "Pulse and Digital Circuits" on p. 436. Each of the outputs from the switch is applied to individual ones of the storage tubes 56–58 to control the write and the read operation therein.

The horizontal scan operation in the storage tubes is controlled by the horizontal synchronism signal $f_h$ from demodulator and separator 72 (FIG. 1), applied to a scan amplifier 83 to continually generate horizontal scan signals on the lead 84. One conventional scan amplifier that could be used has been described with relation to scan amplifier 76. The horizontal scan signal on lead 84 is simultaneously applied to all of the storage tubes 56–58 to control the deflection plates therein for an appropriate scanning action.

In addition to the above-described write-read control inputs to the storage tubes, a DC supply voltage is fed to all of the storage tubes by means of a regulated power supply 86 which is connected to receive power from the 60-cycle AC input and to generate a DC signal on the output lead 87. One regulated power supply that could be used is described by Grab and Kiver in Applications of Electronics, McGraw-Hill, 1960, p. 181.

The tape speed is accurately controlled to reduce time base instability by means of a feedback loop connected to receive the vertical synchronism signal $f_v$ from the signal separator 49 and to control the speed of a capstan drive motor 88. In operation, the vertical synchronism signal $f_v$ is applied to the scan amplifier 76 to generate the vertical scan output signal that is phase-compared to the 60-cycle AC input at a magnetic brake 89. When phase variations occur between the AC input and the vertical synchronism signal $f_v$, the magnetic brake 89 will increase or decrease the mechanical forces which the motor 88 has to overcome. One magnetic brake that could be used is described by B. A. Cola and J. M. Urtis in "A High-Speed Precision Instrumentation Tape Recorder," Magnetic Recording RCA 1964, pp. 30–35. As a result, the phase of the playback signal is continually compared to the relatively stable 60-cycle AC signal, whereupon phase variations of the play-back video signal is continually corrected by speeding up and slowing down the tape speed in direct relation to the phase variations of the playback vertical synchronism signal $f_v$.

Figure 4:
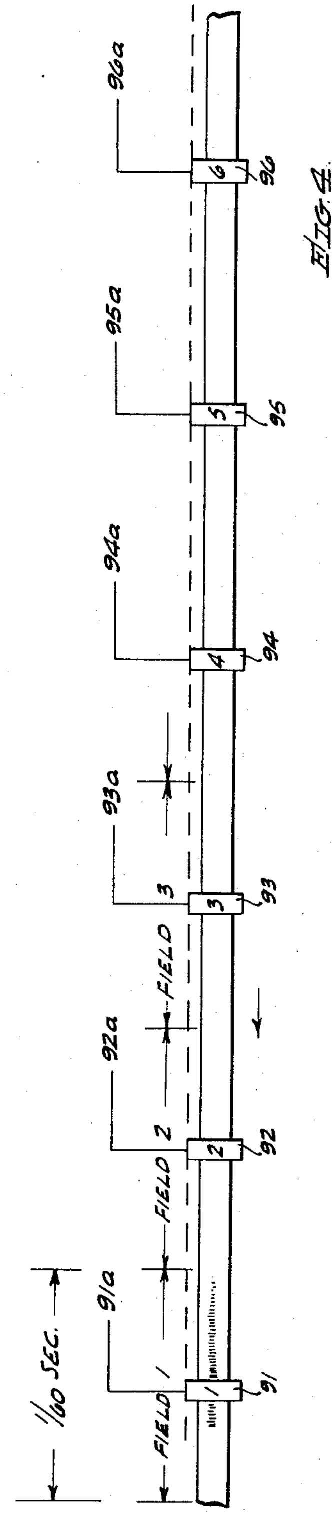
FIGS. 4 and 5 are schematic diagrams illustrating a second embodiment of a portion of the playback circuit.
Figure 5:
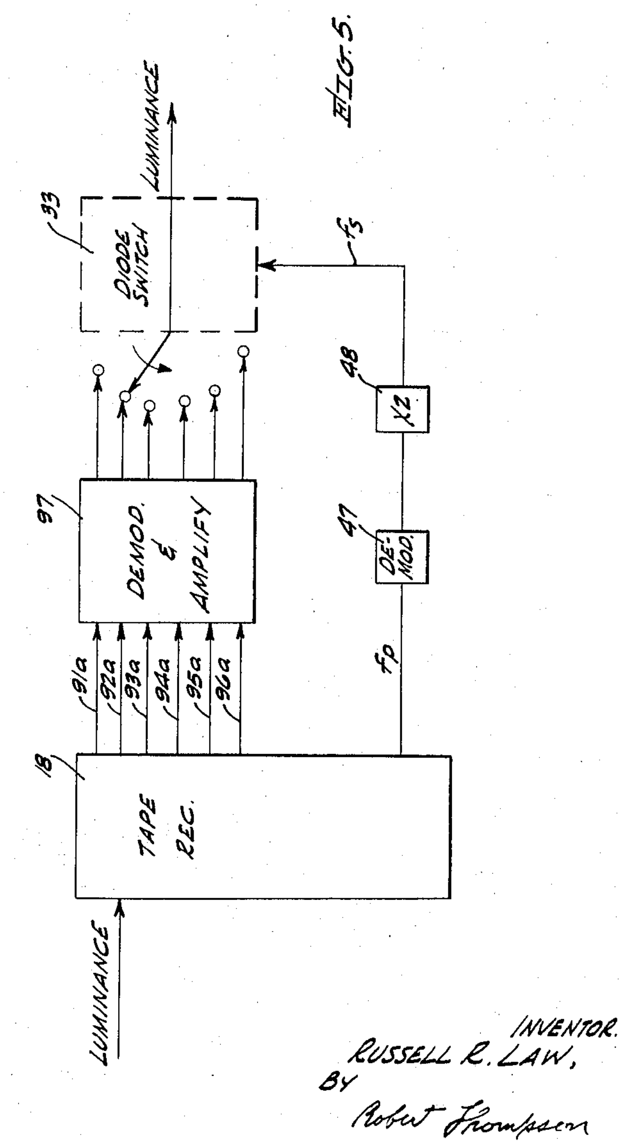

A second embodiment of a circuit for playing back the recorded luminance signal is illustrated in FIGS. 4 and 5. The playback technique used therein is equivalent to the previously described technique in that the information corresponding to one out of every six information areas is sampled in a pattern which repeats every three frames (six fields) and are combined into a composite image for subsequent viewing.

Referring to FIG. 4, the playback head associated with the tape recorder 18 has a plurality of magnetic pickup heads 91 through 96, secured at equally spaced intervals adjacent the path of magnetic tape travel. In effect, the magnetic pickups are each positioned one image field apart relative to the sampled signals recorded on the magnetic tape. For example, if the tape were run at a longitudinal speed of 30 inches per second, and if a television image field has a period of 1/60 of one second, the distance between adjacent magnetic pickup heads would be ½ inch, and the over-all distance between the first magnetic pickup head 91 and the last magnetic pickup head 96 would be 2½ inches.

Referring now to the circuit of FIG. 5, the luminance information detected by the magnetic pickup heads is applied in parallel to a demodulator and amplifier circuit 97 that converts the demodulated information to a usable form and amplifies it to a usable level.

In order to combine the demodulated luminance information from six fields into a composite image form a commutator switch of the type described with reference to the diode switch 33 is coupled to selectively receive the demodulated luminance signal in a sequential order. To achieve a proper switching sequence of the commutator switch 33, the pilot frequency $f_p$ is demodulated at 47 and is multiplied two times at multiplier 48 and is applied to the diode switch 33 at a frequency equal to the above described sampling frequency signal of 635.25 kc. The resultant composite video output information from the switch 33 will have a halved resolution and a frame repetition rate of 30 cycles per second when subsequently viewed.

Tests were also conducted on another bandwidth reduction system in which no storage means were employed. It was discovered that by processing a standard video signal in accordance with the previously discussed sampling technique and by laying down the resulting low-resolution fields sequentially in proper intermeshed registry with one another, an intelligible picture was obtained.

While the salient features of the invention have been shown and described with respect to several embodiments, it will be readily apparent that numerous modifications may be made within the spirit and scope of the invention and it is, therefore, not desired to limit the invention to the exact details shown except insofar as they may be defined in the following claims.

What is claimed is:

1. A circuit for recording television signals comprising: a sampler means coupled to receive the television signals for sampling one out of every *n* information areas with a scan pattern such that the same information area is sampled only once every X-frame; a recorder having a recording medium coupled to receive the sampled television signals for storing the signals on said recording medium; means coupled to said recorder for playing back the signals stored on said recording medium; and means coupled to receive the played-back signals for combining X-sequential frames of the played-back signals into a composite image for subsequent viewing.

2. A circuit for recording color television signals comprising: a sampler means coupled to receive the luminance and the chrominance television signals for sampling one out of every *n* information areas with a scan pattern such that sampling of the same information area of each of the signals is repeated only once every X-frame; a recorder having a recording medium coupled to receive the sampled television signals for storing the luminance signal and the chrominance signals at separate storage portions thereon; means coupled to said recorder for playing back the signals stored at the separate storage portions of said recording medium; and means coupled to receive the played-back signals for combining X-sequential frames of each of the played-back signals into a composite image signal for subsequent viewing.

3. A circuit for recording television signals comprising: a means coupled to receive the television signals for sampling one out of every *n* information areas in a scan pattern such that the same information area is sampled only once every X-frame; a recorder means having a recording medium coupled to receive the sampled television signals for storing the signals on said recording medium; means coupled to said recorder for playing back the signals stored on said recording medium; a first storage means and a second storage means each operable to receive and store a series of sequential frames of played-back signals for combining the played-back signal frame into a composite image signal frame; and switching means coupled to alternately write the played-back signals into one of said storage means and to read out previously stored played-back signals from said other storage means.

4. A circuit for recording television signals comprising: a means coupled to receive the television signals for sampling one out of every *n* information areas in a scan pattern such that the same information area is sampled only once every X-frame; a recorder means having a recording medium coupled to receive the sampled television signals for storing the signals on said recording medium; means coupled to said recorder for playing back the signals stored on said recording medium; a first storage tube and a second storage tube each operable to receive and store sequential frames of played-back signals for combining the played-back signals into a composite image signal; and switching means coupled to alternately write X-sequential frames of the played-back signals into one of said storage tubes and to read out the stored played-back signals of said other storage tubes.

5. A circuit for recording television signals comprising: a means coupled to receive the television signals for sampling one out of every $n$ information areas in a scan pattern such that the same information area is sampled only once every X-frame; a recorder means having a recording medium coupled to receive the sample television signals for storing the signals on said recording medium; means coupled to said recorder for playing back the signals stored on said recording medium; a first storage tube, a second storage tube, and a third storage tube each selectively coupled to receive sequential frames of played-back signals for combining the played-back signals into a composite image signal; and switching means coupled to alternately write no more than X-sequential frames of the played-back signals into one of said storage means and to read out the stored played-back signals in another of said storage means and to erase the remaining said storage tube in the time interval between read and write operations therefrom.

6. A circuit for recording television signals comprising: a means coupled to receive the chrominance television signals for sampling one out of every $n$ information areas in a scan pattern such that the same information area is sampled only once every X-frame; a recorder means having a recording medium coupled to receive the sampled television signals for storing the signals on said recording medium; means coupled to said recorder for playing back the sampled signals stored on said recording medium; and first delay means and means coupled to receive the played-back sampled signals including second delay means each coupled to receive the played-back signals for delaying the played-back sampled signals for one scan line duration into series pulse relationship with non-delayed played-back sampled signals and combining the non-delayed and delayed signals with one another on the scan lines, and adding the combined signals associated with said first delay means and said second delay means into a composite chrominance signal for subsequent viewing.

7. A circuit for recording television signals comprising: a means coupled to receive the chrominance television signals for sampling one out of every $n$ information areas in a scan pattern such that the same information area is sampled only once every X-frame; a recorder means having a recording medium coupled to receive the sampled television signals for storing the signals on said recording medium; means coupled to said recorder for playing back the sampled signals stored on said recording medium; and means coupled to receive the played-back sampled signals including first delay line and second delay line each coupled to receive the played-back signals for delaying the played-back information signals for at least one multiple of a scan line duration into sequential serial pulse relationship with non-delayed played-back signals and for combining the non-delayed and delayed played-back signals of a series of scan lines on single lines and adding the signals associated with said first delay line and said second line into a composite chrominance signal for subsequent viewing.

8. A circuit for recording color television signals comprising: a sampler means to receive the luminance signal and the chrominance signal for sampling one out of every $n$ information areas with a scan pattern such that the sampling of the same information area of the image frame is repeated only once every X-frame; a recorder having a recording medium coupled to receive the sampled television signals for storing the luminance signal and the chrominance signal at separate storage portions thereon; means coupled to said recorder for separately playing back the signals stored at the separate storage portions of said recording medium; storage means coupled to receive the played-back luminance signals for storing and combining a sequential series of frames of the played-back signals into a composite image signal for subsequent viewing; and delay means coupled to receive the played-back chrominance signals for delaying, adding, and combining the played-back chrominance signals of a sequential series of scan lines into a composite image signal for subsequent viewing.

9. A circuit for recording color television signals comprising: a sampler means to receive the luminance and the chrominance television signals for sampling one out of every $n$ information areas with a scan pattern such that the sampling of the same information area of the image frame is repeated only once every X-frame; a recorder having a recording medium coupled to receive the sampled television signals for storing the luminance signal and the chrominance signal at separate storage portions thereon; means coupled to said recorder for separately playing back the signals stored at the separate storage portions of said recording means; storage tube means coupled to receive the played-back luminance signals for storing and combining no more than X-sequential frames of the played-back signals into a composite image signal for subsequent viewing; and delay means coupled to receive the played-back chrominance signals for delaying and combining the played-back signals of a sequential series of scan lines into a composite image signal for subsequent viewing.

10. A circuit for recording color television signals comprising: a sampler means to receive the luminance and the chrominance television signals for sampling one out of every $n$ information areas with a scan pattern such that the sampling of the same information area of the image frame is repeated only once every X-frame; a recorder having a recording medium coupled to receive the sampled television signals for storing the luminance signal and the chrominance signal at separate storage portions thereon; means coupled to said recorder for separately playing back the signals stored at the separate storage portions of said recording means; storage means coupled to receive the played-back luminance signals for storing and combining no more than X-sequential frames of the played-back signals into a composite image signal for subsequent viewing; delay means coupled to receive the played-back chrominance signals for delaying and combining the played-back signals of a sequential series of scan lines into a composite image signal for subsequent viewing; and recombining means coupled to receive the composite luminance image signal and the composite chrominance image signal for recombining the composite signals into a reconstructed image for viewing.

11. A circuit for recording color television signals comprising: a sampler means to receive the luminance and the chrominance television signals for sampling one out of every $n$ information areas with a scan pattern such that the sampling of the same information area of the image frame is repeated only once every X-frame; a recorder having a recording medium coupled to receive the sampled television signals for storing the luminance signal and the chrominance signal at separate storage portions thereon; means coupled to said recorder for separately playing back the signals stored at the separate storage portions of said recording means; a first storage means and a second storage means each selectively coupled to receive sequential frames of played-back luminance signals for combining the played-back luminance signal frames into a composite image signal frame; switching means coupled to alternately write no more than X-sequential frames of the played-back signals into one of said storage means and to read out previously stored played-back signals from said other storage means; and delay means coupled to receive the played-back chrominance signals for delaying and combining the played-back chrominance signals from a sequential series of scan lines into a composite image signal for subsequent viewing.

12. A method of recording color television signals along separate longitudinal tracks on a magnetic recording tape comprising the steps of: recording a pilot frequency related to a sampling rate along a centermost longitudinal recording track, recording a first chrominance signal along one of the adjacent outermost longitudinal recording tracks on one side of the central recording track; recording a second chrominance signal along the other adjacent outermost longitudinal recording track on the other side of the central recording track; and recording the luminance signal component along another more outward longitudinal recording track.

13. A circuit for playing back reduced resolution television signals comprising: means having a recording medium with a sampled television signal stored thereon; means coupled to said recording medium for playing back the signals stored thereon; and means coupled to receive the played-back signals including first delay means and second delay means each coupled to receive the played-back signals for phase shifting for one scan line duration the played-back information signals into series pulse relationship with non-phase shifted signals on a subsequent line, and adding the combined signals associated with said first delay means and said second delay means into a composite signal for subsequent viewing.

14. A circuit for reproducing low resolution color television signals in which one out of every *n* information areas is sampled in a pattern that is repeated every X-frames comprising: means having a recording medium coupled to receive the low resolution sampled color television signal for storing the luminance signal and the chrominance signal at separate storage portions thereof; means coupled to said recording medium for separately playing back the signals stored at the separate storage portions of said recording medium; means coupled to receive the played-back luminance signals for combining X-sequential frames of the played-back signals into a composite image signal for subsequent viewing; and means coupled to receive the played-back chrominance signals for delaying for multiples of one scan line the played-back signals into series pulse relationship on a subsequent line with non-delayed played-back signals and combining the series pulse chrominance signals into a composite image signal for subsequent viewing.

15. A circuit for reproducing low resolution color television signals in which one out of every *n* information areas is sampled in a pattern that is repeated every X-frames comprising: means having a recording medium with a low resolution luminance signal and chrominance signals stored at separate portions thereon; means coupled to said recording medium for separately playing back the signals stored at separate portions thereon; a first storage means and a second storage means each operably coupled to receive and store X-sequential frames of played-back luminance signals for combining the played-back luminance signals into a composite image signal frame; switching means coupled to alternately write X-sequential frames of the played-back luminance signals into one of said storage means and to read out previously stored played-back luminance signals of said other storage means and means coupled to receive the played-back chrominance signals including first delay means and second delay means each coupled to receive the played-back chrominance signals for delaying a plurality of played-back chrominance signals for multiples of one scan line into a series pulse relationship with non-delayed chrominance signals on a subsequent line and for adding the combined signals associated with said first delay means and second delay means into a composite signal for subsequent viewing.

16. A circuit of claim 15 further including recombining means coupled to receive the composite luminance image signal and the composite chrominance image signal for recombining the composite signals into a reconstructed image for viewing.

References Cited

UNITED STATES PATENTS

| | | | |
|---|---|---|---|
| 2,517,265 | 8/1950 | Wald | 178—6.8 |
| 2,892,017 | 6/1959 | Houghton | 178—6.6 |
| 2,892,022 | 6/1959 | Houghton | 178—5.4 |
| 2,938,945 | 5/1960 | De France | 178—5.4 |
| 2,969,425 | 1/1961 | Hughes | 178—5.4 |
| 3,128,338 | 4/1964 | Teacher et al. | 178—6 |
| 3,136,847 | 6/1964 | Brown | 178—6.8 |

JOHN W. CALDWELL, *Primary Examiner.*

J. A. O'BRIEN, R. MURRAY, *Assistant Examiners.*

UNITED STATES PATENT OFFICE

CERTIFICATE OF CORRECTION

Patent No. 3,372,228 March 5, 1968

Russell R. Law

It is certified that error appears in the above identified patent and that said Letters Patent are hereby corrected as shown below:

Column 11, lines 31 and 32, cancel "means coupled to receive the played-back sampled signals including" and insert the same before "first" in line 31, same column 11.

Signed and sealed this 3rd day of February 1970.

(SEAL)
Attest:

Edward M. Fletcher, Jr.
Attesting Officer

WILLIAM E. SCHUYLER, JR.
Commissioner of Patents